United States Patent
Boyd

Patent Number: 5,711,248
Date of Patent: Jan. 27, 1998

[54] WILD GAME WATERING SYSTEM

[76] Inventor: Leslie D. Boyd, Rt. 2 Box 350A, Port Lavaca, Tex. 77979

[21] Appl. No.: 646,032

[22] Filed: May 7, 1996

[51] Int. Cl.$^6$ .................................................. A01K 7/00
[52] U.S. Cl. ............................................................. 114/77
[58] Field of Search ........................ 119/77, 51.5, 52.1, 119/54

[56] References Cited

U.S. PATENT DOCUMENTS 3,074,377  1/1963  Spencer .................. 119/52.1 X

Primary Examiner—Thomas Price

[57] ABSTRACT

A new Wild Game Watering System for providing an automatic water distributing system for wild game allowing the user to retain wild game in the user's preferred hunting area contributing to improved hunting for the user. The inventive device includes a water retaining pan which retains water and a water storage container supplying the water retaining pan with a continuous supply of water for wild game to drink.

4 Claims, 3 Drawing Sheets

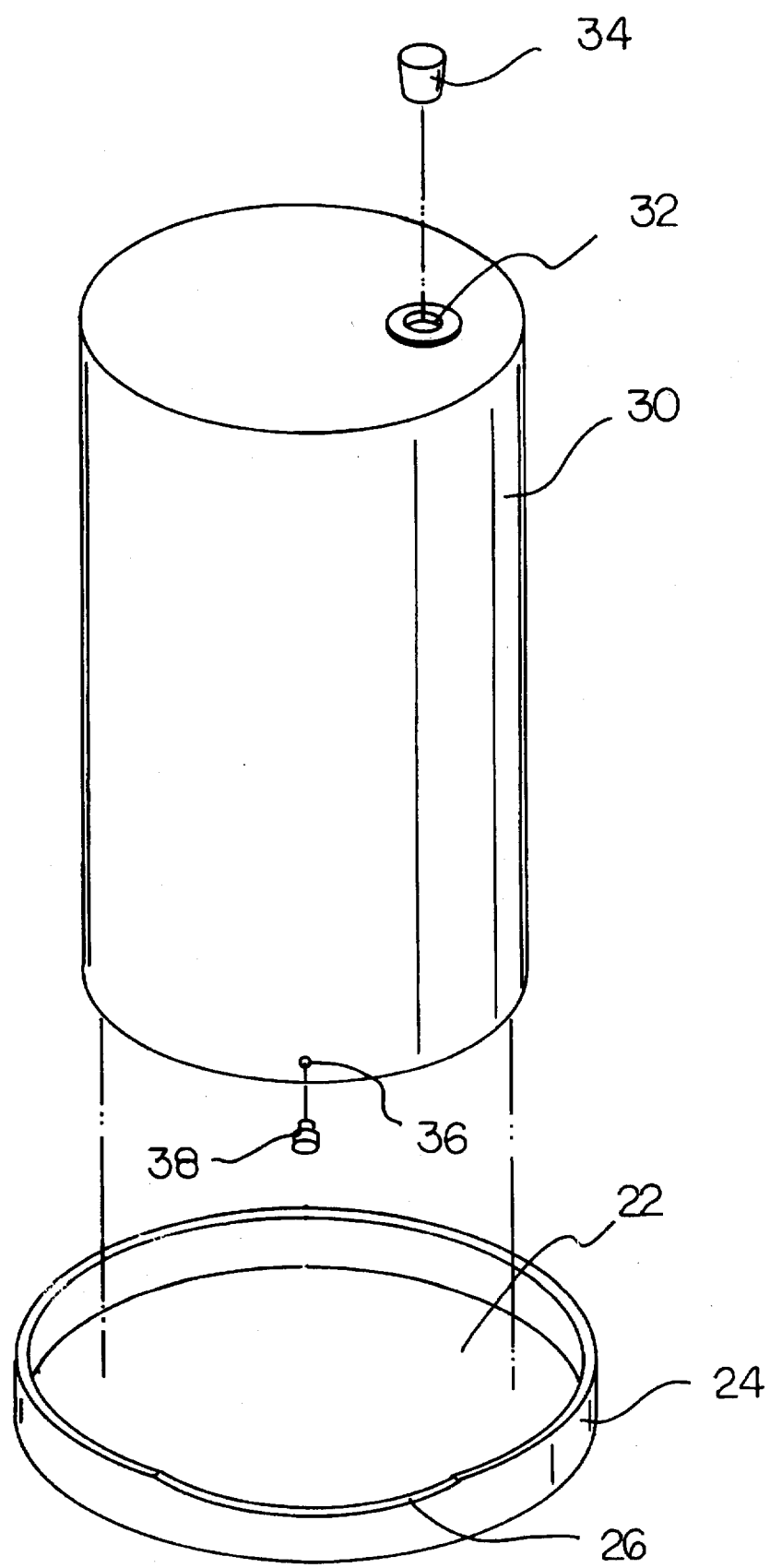

WILD GAME WATERING SYSTEM

BACKGROUND OF THE INVENTION

1. Field of the Invention

The present invention relates to Animal Watering Devices and more particularly pertains to a new Wild Game Watering System for providing an automatic water distributing system for wild game allowing the user to retain wild game in the user's preferred hunting area contributing to improved hunting for the user.

2. Description of the Prior Art

The use of Animal Watering Devices is known in the prior art. More specifically, Animal Watering Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Animal Watering Devices include U.S. Pat. No. 4,494,483; U.S. Pat. No. 5,207,182; U.S. Design Pat. No. 335,197; U.S. Pat. No. 4,573,434; U.S. Pat. No. 5,003,927 and U.S. Pat. No. 4,509,460.

While these devices fulfill their respective, particular objectives and requirements, the aforementioned patents do not disclose a new Wild Game Watering System. The inventive device includes a water retaining pan which retains water and a water storage container supplying the water retaining pan with a continuous supply of water for wild game to drink.

In these respects, the Wild Game Watering System according to the present invention substantially departs from the conventional concepts and designs of the prior art, and in so doing provides an apparatus primarily developed for the purpose of providing an automatic water distributing system for wild game allowing the user to retain wild game in the user's preferred hunting area contributing to improved hunting for the user.

SUMMARY OF THE INVENTION

In view of the foregoing disadvantages inherent in the known types of Animal Watering Devices now present in the prior art, the present invention provides a new Wild Game Watering System construction wherein the same can be utilized for providing an automatic water distributing system for wild game allowing the user to retain wild game in the user's preferred hunting area contributing to improved hunting for the user. The general purpose of the present invention, which will be described subsequently in greater detail, is to provide a new Wild Game Watering System apparatus and method which has many of the advantages of the Animal Watering Devices mentioned heretofore and many novel features that result in a new Wild Game Watering System which is not anticipated, rendered obvious, suggested, or even implied by any of the prior art Animal Watering Devices, either alone or in any combination thereof.

To attain this, the present invention generally comprises a water retaining pan which retains water and a water storage container supplying the water retaining pan with a continuous supply of water for wild game to drink.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Wild Game Watering System apparatus and method which has many of the advantages of the Animal Watering Devices mentioned heretofore and many novel features that result in a new Wild Game Watering System which is not anticipated, rendered obvious, suggested, or even implied by any of the prior art Animal Watering Devices, either alone or in any combination thereof.

It is another object of the present invention to provide a new Wild Game Watering System which may be easily and efficiently manufactured and marketed.

It is a further object of the present invention to provide a new Wild Game Watering System which is of a durable and reliable construction.

An even further object of the present invention is to provide a new Wild Game Watering System which is susceptible of a low cost of manufacture with regard to both materials and labor, and which accordingly is then susceptible of low prices of sale to the consuming public, thereby making such Wild Game Watering System economically available to the buying public.

Still yet another object of the present invention is to provide a new Wild Game Watering System which provides in the apparatuses and methods of the prior art some of the advantages thereof, while simultaneously overcoming some of the disadvantages normally associated therewith.

Still another object of the present invention is to provide a new Wild Game Watering System for providing an automatic water distributing system for wild game allowing the user to retain wild game in the user's preferred hunting area contributing to improved hunting for the user.

Yet another object of the present invention is to provide a new Wild Game Watering System which includes a water retaining pan which retains water and a water storage container supplying the water retaining pan with a continuous supply of water for wild game to drink.

Even still another object of the present invention is to provide a new Wild Game Watering System wherein the user is able to retain wild game in the user's preferred hunting area which in turn improves the user's supply of wild game for hunting.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an exploded isometric illustration of the present invention.

DESCRIPTION OF THE PREFERRED EMBODIMENT

Figure 1:
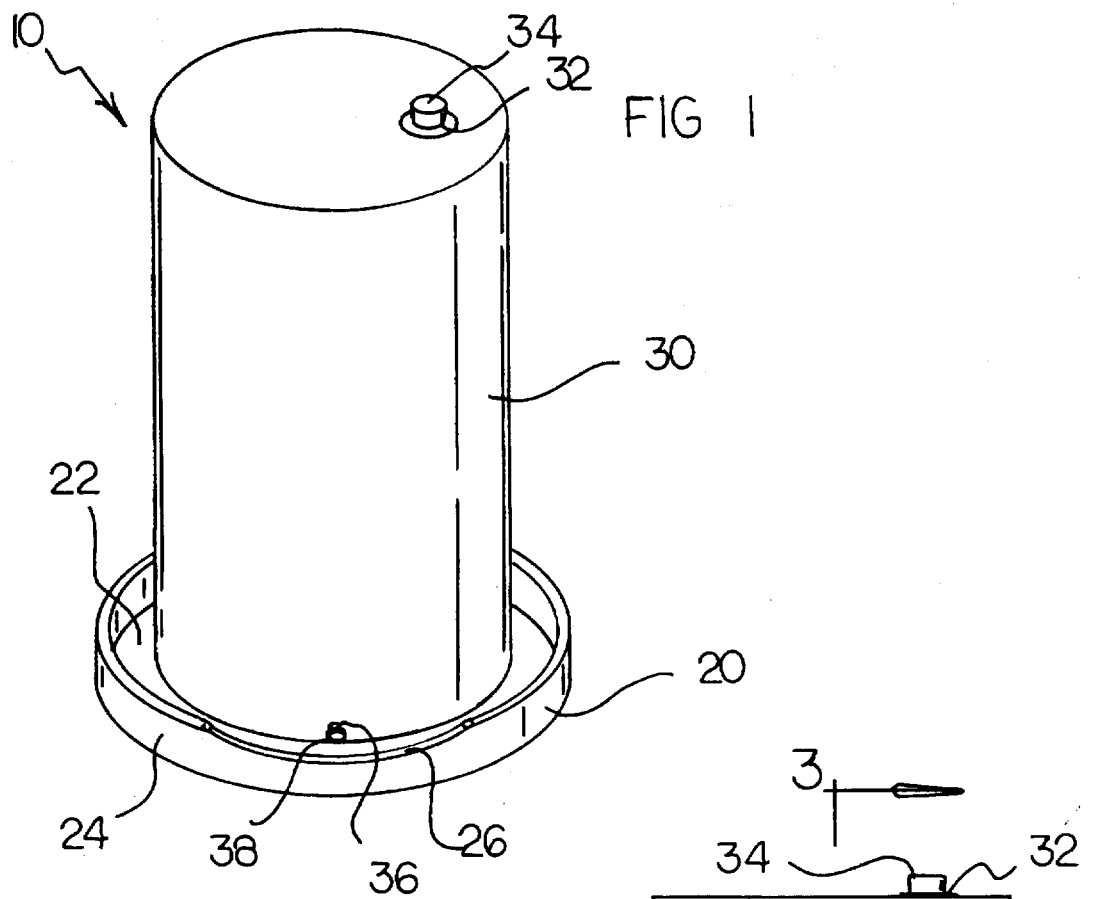
FIG. 1 is a front perspective view of a new Wild Game Watering System according to the present invention.
Figure 2:
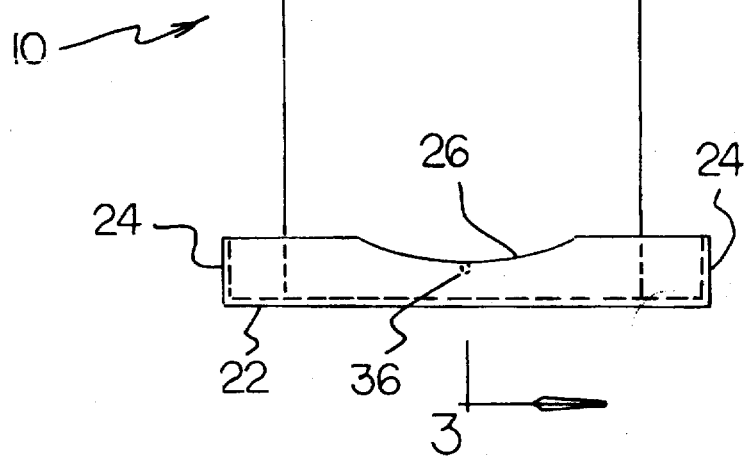
FIG. 2 is a side view thereof.
Figure 3:
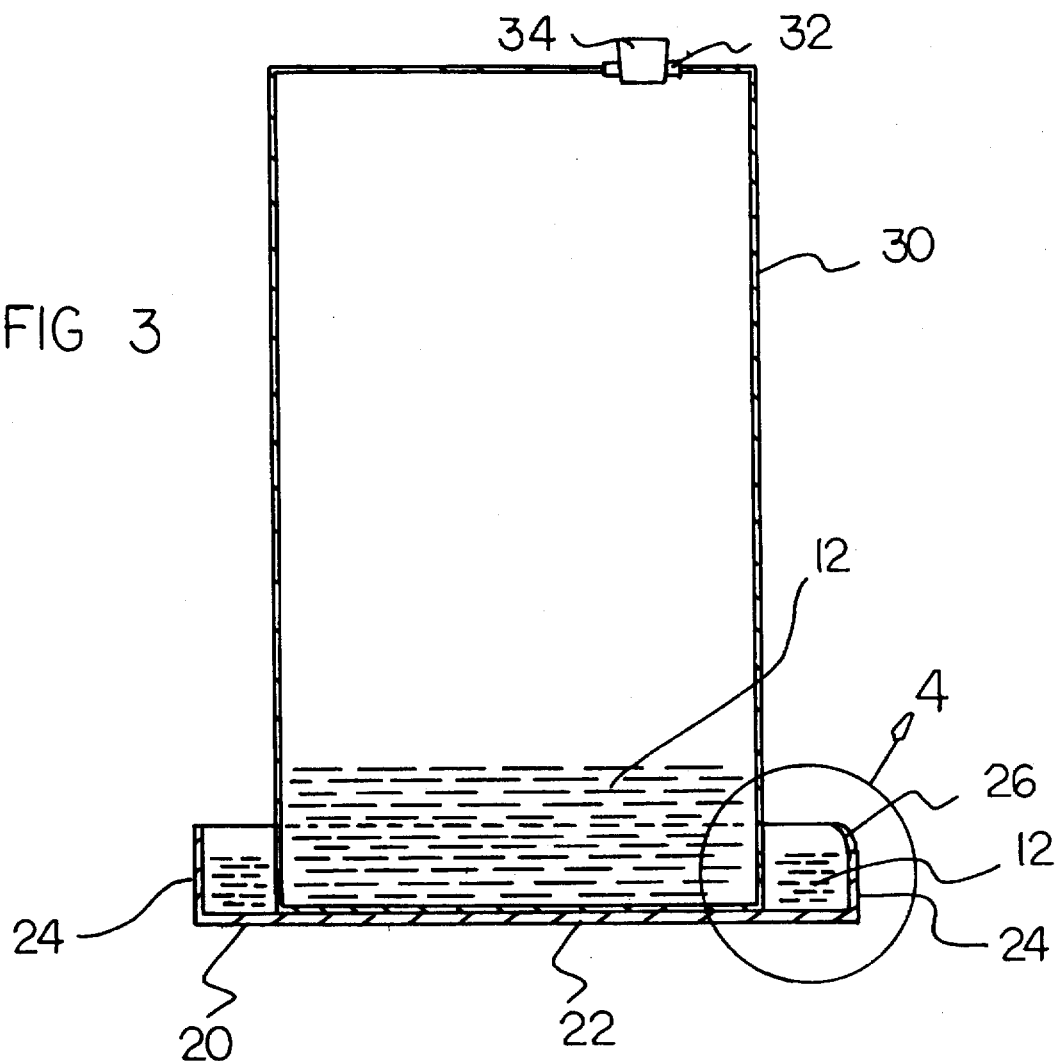
FIG. 3 is a cross sectional view taken along line 3—3 of FIG. 2.
Figure 4:
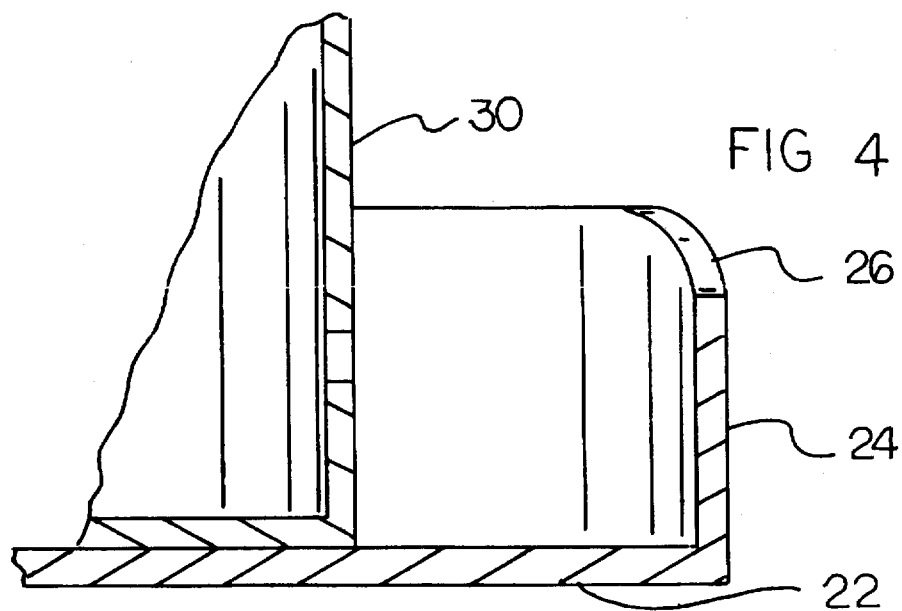
FIG. 4 is an exploded illustration of FIG. 3.

With reference now to the drawings, and in particular to FIGS. 1 through 5 thereof, a new Wild Game Watering System embodying the principles and concepts of the present invention and generally designated by the reference numeral 10 will be described.

More specifically, it will be noted that the Wild Game Watering System 10 comprises a water retaining pan 20, a water storage container 30 removably positioned on the water retaining pan 20 and water 12 inside of the water storage container 30.

As best illustrated in FIGS. 1 through 5, it can be shown that a horizontal bottom wall member 22 is secured orthogonally to a side wall ring member 24 forming the water retaining pan 20. The side wall ring member 24 includes an animal drinking notch 26 along the upper portion of the side wall ring member 24 allowing animals to drink from the present invention. A filling aperture 32 is on the top portion of the water storage container 30 allowing the user to fill the water storage container 30 with water 12. A filling cap member 34 is removably inserted through the filling aperture 32 creating an air tight vacuum in the upper portion of the water storage container 30 which retains the water 12 from overflowing the water retaining pan 20. A water releasing aperture 36 is positioned near the lower portion of the water storage container 30 no higher than the animal drinking notch 26 in the side wall ring member 24. The water releasing aperture 36 allows air to enter the water storage container 30 when the water level in the water retaining pan 20 is below the water releasing aperture 36 which decreases the vacuum pressure in the upper portion of the water storage container 30 allowing dispensing of water 12 through the water releasing aperture 36. A water releasing plug 38 is removably inserted into the water releasing aperture 36 when the user is filling the water storage container 30 with water 12. The water storage container 30 is preferably formed to the shape of a barrel.

In use, the user places the water storage container 30 inside of the water retaining pan 20 with the water releasing plug 38 inserted. The user then fills the water storage container 30 with water 12 through the filling aperture 32 on top of the water storage container 30. Upon filling, the user inserts the filling cap member 34 into the filling aperture 32 creating a vacuum in the upper portion of the water storage container 30. The user then removes the water releasing plug 38 from the water releasing aperture 36 allowing the water 12 to flow into the water retaining pan 20 until the water level gets to the height of the water releasing aperture 36.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Wild Game Watering System comprising:

a water retaining pan;

a water storage container removably positioned on the water retaining pan for retaining water within; and the water retaining pan comprises a horizontal bottom wall member secured orthogonally to a side wall ring member forming a water tight pan wherein the water storage container includes a filling aperture on the upper portion of the water storage container, and a filling cap member for removably covering the filling aperture; and a water releasing aperture located near the lower portion of the water storage container and a removable water releasing plug for removably projecting into the water releasing aperture.

2. A Wild Game Watering System comprising:

a water retaining pan;

a water storage container removably positioned on the water retaining pan for retaining water within; and the water retaining pan comprises a horizontal bottom wall member secured orthogonally to a side wall ring member forming a water tight pan and wherein the side wall ring member includes an animal drinking notch along the upper portion of the side wall ring member;

wherein the water storage container includes a filling aperture on the upper portion of the water storage container, and a filling cap member which removably projects within the filling aperture; and wherein the water storage container further comprises a water releasing aperture near the lower portion of the water storage container no higher than the animal drinking notch in the side wall ring member and a removable water releasing plug projecting into the water releasing aperture.

3. The Wild Game Watering System of claim 2, wherein the water storage container is formed to the shape of a cylinder.

4. A Wild Game Watering System comprising:

a water retaining pan;

a water storage container removably positioned on the water retaining pan for retaining water within;

the water retaining pan comprises a horizontal bottom wall member secured orthogonally to a side wall ring member forming a water tight pan and wherein the side wall ring member includes an animal drinking notch along the upper portion of the side wall ring member;

the water storage container includes a filling aperture on the upper portion of the water storage container, and a filling cap member which removably projects within the filling aperture; and the water storage container further comprises a water releasing aperture near the lower portion of the water storage container no higher than the animal drinking notch in the side wall ring member and a removable water releasing plug projecting into the water releasing aperture.

* * * * *